(12) United States Patent
Migali

(10) Patent No.: US 12,454,008 B2
(45) Date of Patent: Oct. 28, 2025

(54) PEELING MACHINE FOR ELONGATED PRODUCTS

(71) Applicant: DANIELI & C. OFFICINE MECCANICHE S.P.A., Buttrio (IT)

(72) Inventor: Simone Antonio Migali, Udine (IT)

(73) Assignee: DANIELI & C. OFFICINE MECCANICHE S.P.A., Buttrio (IT)

(*) Notice: Subject to any disclaimer, the term of this patent is extended or adjusted under 35 U.S.C. 154(b) by 570 days.

(21) Appl. No.: 17/905,666

(22) PCT Filed: Mar. 5, 2021

(86) PCT No.: PCT/IT2021/050052
§ 371 (c)(1),
(2) Date: Sep. 6, 2022

(87) PCT Pub. No.: WO2021/176487
PCT Pub. Date: Sep. 10, 2021

(65) Prior Publication Data
US 2023/0116542 A1     Apr. 13, 2023

(30) Foreign Application Priority Data

Mar. 6, 2020 (IT) .................... 102020000004843

(51) Int. Cl.
*B23B 5/12*     (2006.01)
*B23Q 11/10*    (2006.01)

(52) U.S. Cl.
CPC .............. *B23B 5/12* (2013.01); *B23Q 11/103* (2013.01)

(58) Field of Classification Search
CPC ... B23B 5/12; B23B 2215/72; B23B 2220/40; B23Q 11/103
See application file for complete search history.

(56) References Cited

U.S. PATENT DOCUMENTS

| 672,872   | A |   | 4/1901  | Dreyer                    |
|-----------|---|---|---------|---------------------------|
| 4,293,251 | A | * | 10/1981 | Anderson ...... F16L 41/12 |
|           |   |   |         | 285/190                   |

(Continued)

FOREIGN PATENT DOCUMENTS

| DE | 3343710   | A  | * | 6/1985 | ........ B23B 5/12 |
| DE | 19606670  | A1 | * | 8/1997 | ........ B23B 5/12 |

(Continued)

OTHER PUBLICATIONS

International Search Report and Written Opinion, issued in the corresponding PCT application No. PCT/IT2021/050052 dated Jul. 9, 2021, 17 pages.

*Primary Examiner* — Nicole N Ramos
(74) *Attorney, Agent, or Firm* — HSML P.C.

(57) ABSTRACT

The peeling machine, comprising: a rotating head installed rotating about an axis of rotation and provided with a central cavity in which, during use, there is disposed an elongated product to be worked; the rotating head is provided with a plurality of tools and with at least one adjustment unit configured to move the tools away from or toward the elongated product; a first motor configured to make the rotating head rotate about the axis of rotation; and a transmission unit configured to transmit motion from a second motor to the adjustment unit in order to simultaneously adjust the radial position of the tools; the transmission unit comprises a differential device kinematically connected between the second motor and the adjustment unit so that an adjustment of the position of the tools with respect to the elongated product corresponds to the drive of the second motor.

15 Claims, 3 Drawing Sheets

(56) References Cited

U.S. PATENT DOCUMENTS

| | | | | |
|---|---|---|---|---|
| 4,408,506 | A * | 10/1983 | Coy | B23B 5/12 |
| | | | | 82/127 |
| 4,626,149 | A | 12/1986 | Holy et al. | |
| 4,770,570 | A * | 9/1988 | Tsui | F16L 27/087 |
| | | | | 408/241 B |
| 4,890,963 | A * | 1/1990 | Keritsis | F16L 27/087 |
| | | | | 285/190 |
| 6,053,082 | A | 4/2000 | Rupp et al. | |
| 8,992,137 | B2 * | 3/2015 | Gregory | B23Q 11/10 |
| | | | | 279/20 |
| 2016/0167185 | A1 * | 6/2016 | Nakazawa | B23Q 11/103 |
| | | | | 285/272 |
| 2018/0117677 | A1 * | 5/2018 | Migali | B23B 5/12 |
| 2019/0118267 | A1 | 4/2019 | Karlsson | |

FOREIGN PATENT DOCUMENTS

| | | | | |
|---|---|---|---|---|
| DE | 19638936 | | 3/1998 | |
| EP | 0501107 | | 9/1992 | |
| WO | 2009/033948 | | 3/2009 | |
| WO | WO-2009033951 A1 * | | 3/2009 | B23B 5/12 |
| WO | 2016/170500 | | 10/2016 | |

* cited by examiner

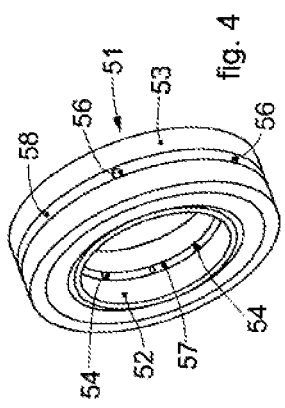
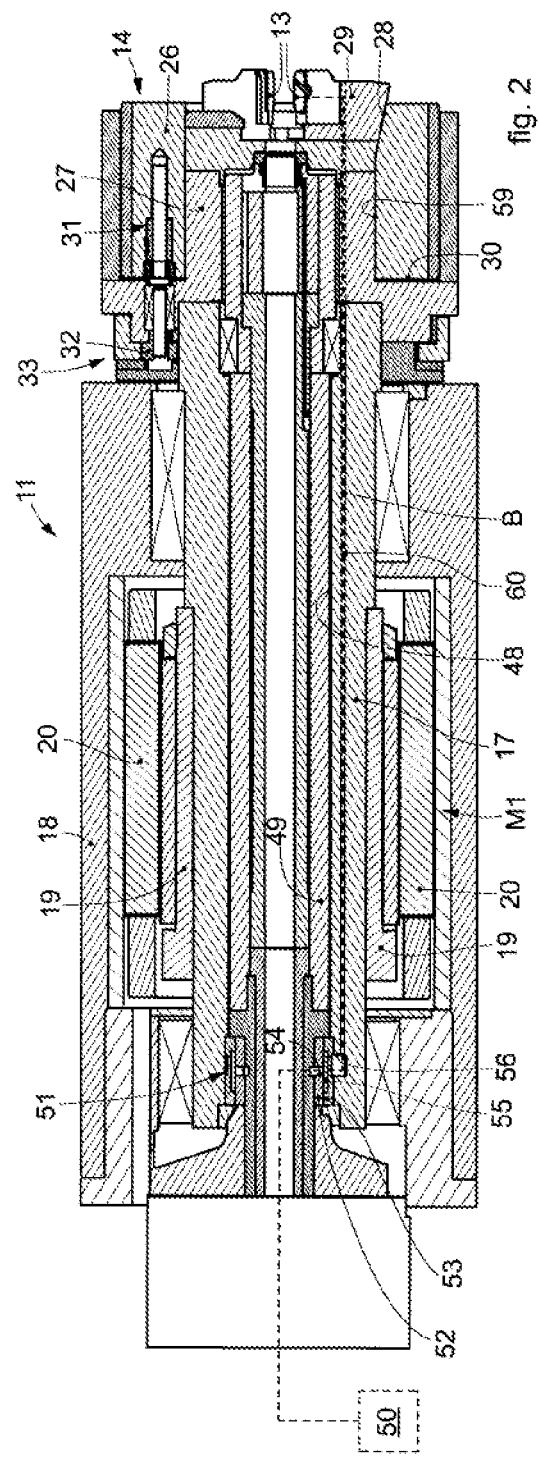

PEELING MACHINE FOR ELONGATED PRODUCTS

FIELD OF THE INVENTION

The present invention concerns a peeling machine for elongated products, such as bars, tubes or similar and comparable products, preferably axial-symmetrical.

The peeling machine according to the present invention is used to reduce, by means of chip removal, the diameter of the product to be worked, by means of tools disposed in a radial pattern on a rotating head, in a central cavity of which the product to be worked is disposed.

BACKGROUND OF THE INVENTION

Peeling machines are known, comprising feed means, suitable to axially feed each product to be worked along its longitudinal axis, and a rotating head that is provided with a central through cavity in which, during use, the product to be worked is made to pass.

The rotating head is made to rotate with respect to a fixed support, coaxially to the longitudinal axis, by means of first motor means.

The tools are installed on the rotating head and are associated with an adjustment unit that allows them to be translated radially with respect to the longitudinal axis, then moved toward or away from the product to be worked.

The adjustment unit is normally driven by second motor means, which allow to adjust the distance of the tools from the product to be worked according to its diameter.

One example of a known peeling machine is described for example in patent application WO-A-2009/033948.

In order to transmit motion from the first motor means to the rotating head, as well as to transmit motion from the second motor means to the distance adjustment unit, known peeling machines comprise a plurality of motion transmission units.

It is known, for example, to provide a differential device, kinematically connected between the second motor means and the adjustment unit, so that an adjustment of the radial position of the tools with respect to the axis of rotation corresponds to the drive of the second motor means.

The differential device is normally connected to the adjustment unit by means of the mandrel, thus requiring at least a first motion transmission unit between the differential device and the mandrel and a second motion transmission unit between the mandrel and the tool adjustment unit.

The presence of different motion transmission units, provided with corresponding gears, determines a general increase in the complexity, costs and sizes of the peeling machine, which normally has quite a substantial bulk. The play between the gears and the components of the motion transmission units, necessary to allow reciprocal movement between them, also entails the generation of vibrations that, with the use of the machine, can accelerate wear, requiring frequent maintenance.

Furthermore, the tools used in the rotating head have to be associated with complex lubrication systems, which have to act on tools able to move at least radially with respect to the axis of rotation of the product to be worked.

Consequently, the lubrication of these tools is often not very efficient, thus determining the need to replace the tools quite frequently. A more efficient lubrication of the tools would lead to a longer life thereof, a reduction in costs and a better control of the tolerances in working the product to be worked, therefore also a better working efficiency.

Due to the structural complexities described above, that is, the need to provide different motion transmission units, and the critical issues relating to known lubrication systems, the working speeds that can be set in known peeling machines are limited, therefore the range of workable products is also limited.

Moreover, known peeling machines often have problems of breaking the chips or offcuts resulting from the peeling of the product to be worked, therefore it is often necessary to stop the peeling machine.

There is therefore a need to perfect a peeling machine that can overcome at least one of the disadvantages of the state of the art.

In particular, one purpose of the invention is to provide a peeling machine for metal products that is simple to make, compact, and that efficiently allows to adjust the radial position of the tools during normal functioning, so as to make the machine extremely versatile to obtain products with different diameters and/or different ranges of products.

Another purpose of the present invention is to provide a peeling machine that is simple to construct, as well as having reduced production and assembly costs.

Another purpose of the present invention is to provide a peeling machine that allows effective lubrication at least of the tools located on the rotating head, in such a way as to guarantee greater efficiency and duration of the tools.

Another purpose of the present invention is to provide a peeling machine that can be used efficiently and precisely even for high working speeds, in which the tolerances of the products to be worked can be precisely controlled and by means of which the downtimes of the machine can be reduced, compared to known solutions.

Yet another purpose is to perfect a machine that comprises a reduced number of components compared to traditional solutions, and that consequently has a better resistance to wear due to the play between the components themselves.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, a peeling machine according to the present invention comprises:
 a rotating head, installed around an axis of rotation and provided with a central cavity in which, during use, there is disposed an elongated product to be worked, wherein the rotating head is provided with a plurality of tools and at least one adjustment unit configured to move the tools away from or toward the elongated product;
 a first motor configured to make the rotating head rotate about the axis of rotation; and
 a transmission unit configured to transmit motion from a second motor to the adjustment unit to simultaneously adjust the radial position of the tools,
wherein the transmission unit comprises a differential device kinematically connected between the second motor and the adjustment unit, so that an adjustment of the position of the tools with respect to the elongated product corresponds to the drive of the second motor.

According to one aspect of the invention, the rotating head comprises a mandrel rotating about the axis of rotation by means of the drive of the first motor and a fixed structure in which the mandrel is housed, wherein the first motor is an electric motor comprising at least one rotor fixed to the mandrel and at least one stator associated with the fixed structure and positioned around the rotor.

By means of the present peeling machine, in which the first motor is positioned directly around the mandrel, therefore without the aid of further motion transmission units, it is possible to advantageously obtain a reduction of the components compared to known machines, and a consequent reduction in the overall bulk of the peeling machine.

Moreover, in the present peeling machine, the conventional systems for lubricating the rotating head are no longer necessary, which determines a lower complexity of the peeling machine, a lower cost for producing the machine and less maintenance interventions.

The inertia of the peeling machine thus obtained is also very low, therefore the machine has a very fast response capacity and, for example, can be stopped quickly in case of emergency.

The possible replacement of the motor and mandrel is also much simpler than known machines; it is also possible to obtain an effective cooling, for example of the tools, which are therefore less subject to thermal expansions. The improved cooling also determines the possibility of accurately keeping the worked product within the desired tolerances, extending the life of the tools used in the working and better breaking the chips or scraps from the working.

The present peeling machine can also work at much higher speeds than known peeling machines, therefore it allows to extend the range of products worked.

According to another aspect of the invention, the present peeling machine can comprise a joint for distributing a cooling fluid housed in the mandrel and associated with a cooling system able to send the cooling fluid to the joint and therefore, by means of a path made in the rotating head, to the tools.

The joint, in particular, is configured to transfer the cooling fluid from a fixed conduit to a rotating one. This embodiment, unlike what is provided in known solutions which normally use static nozzles that send the cooling liquid only in certain steps of the work cycle, allows to send the cooling fluid to the tools of the rotating head during its entire functioning and rotation, obtaining an effective and continuous cooling.

The mandrel can comprise a hole directed along the axis of rotation and in which there is housed at least one guide integral with the fixed structure; the joint is housed between the guide and the mandrel.

In some embodiments, the joint can comprise a fixed internal ring associated with the guide, and a rotating external ring associated with the mandrel.

The joint can also comprise an annular hollow space made between the internal ring and the external ring; the internal ring can comprise one or more holes for the entry of the cooling fluid and the external ring can comprise one or holes for the exit of the cooling fluid.

The one or more entry holes, during use, are therefore connected to a fixed conduit of the cooling system, while the one or more exit holes are connected to a conduit made inside the mandrel and rotating together with it.

The internal ring can also comprise an annular groove where one or more holes for the entry of the cooling fluid are made.

The external ring, in turn, can also comprise an annular groove where one or more holes for the exit of the cooling fluid are made.

In some embodiments, the tools of the rotating head can be supported by sliders slidable on at least one inclined plane made in at least one conical ring mobile inside the adjustment unit by means of one or more drive devices; the sliding of the conical ring determines a sliding of the sliders in a radial direction with respect to the axis of rotation and therefore a movement of the tools toward or away from the elongated product being worked.

The adjustment unit can comprise a fixed main body on which the conical ring is positioned; the conical ring can slide with respect to the fixed body in a bidirectional manner and in a direction parallel to the axis of rotation by means of the one or more drive devices.

The one or more drive devices can comprise one or more lead screws, in particular roller screws or ball screws.

According to some embodiments, it can be provided that the differential device is directly coupled to the second motor, in order to adjust the tools, and to the adjustment unit thereof. In this way, a lower number of motion transmission units is sufficient and the machine is more compact; in addition, the play between the components, and therefore the overall wear to which the machine is subjected, is reduced.

According to some embodiments, the differential device is directly coupled to the adjustment unit and to the rotating head by means of a single transmission unit.

According to other embodiments, the transmission unit comprises a hollow shaft on which a toothed wheel is installed which kinematically meshes with a gear made on a support body of the rotating head, wherein the hollow shaft is provided with a transmission toothed wheel integrally rotatable therewith about an axis of rotation and kinematically connected to the differential device.

According to other embodiments, the differential device comprises at least one first satellite wheel configured to mesh with the transmission toothed wheel and at least one second satellite wheel integrally rotatable with the at least one first satellite toothed wheel and configured to mesh with a first toothed wheel integrally installed on a transmission shaft, which is disposed inside the hollow shaft and is connected to a toothed wheel kinematically connected to the adjustment unit.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 2 is a longitudinal section view of a rotating head provided in the present peeling machine and comprising a mandrel driven by an electric motor;

FIG. 4 is a three-dimensional view of a joint housed inside the rotating head for the distribution of a cooling fluid.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
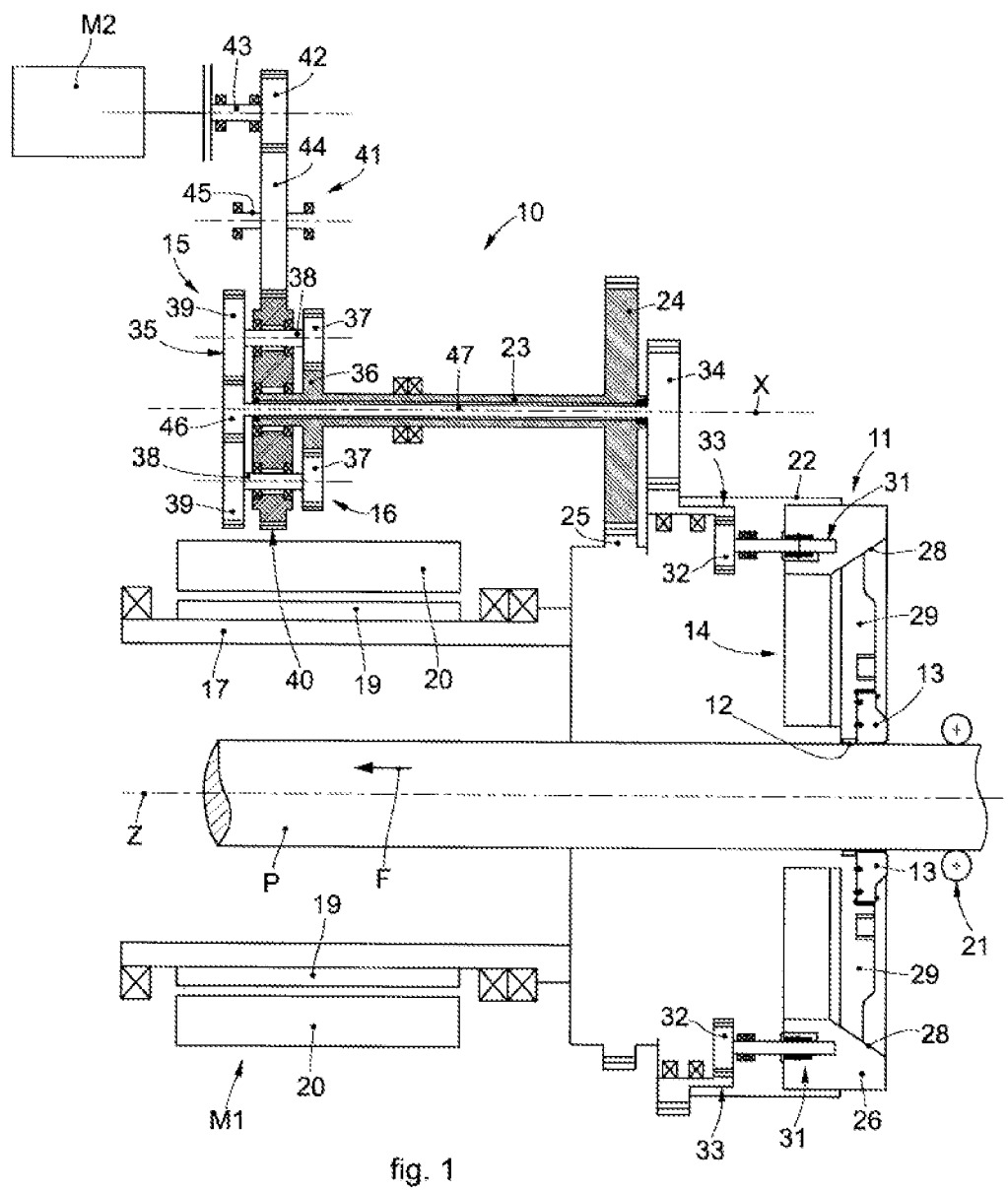
FIG. 1 is a schematic view of a peeling machine in accordance with the present invention.

With reference to the attached drawings, and in particular to FIG. 1 thereof, a peeling machine 10 according to the present invention comprises: a rotating head 11 installed rotating about an axis of rotation Z and provided with a central cavity 12 in which, during use, there is disposed an elongated product P to be worked.

The rotating head 11 is provided with a plurality of tools 13 and with at least one adjustment unit 14 configured to move the tools 13 away from or toward the elongated product P.

The peeling machine 10 comprises a first motor M1 configured to make the rotating head 11 rotate about the axis of rotation Z and a transmission unit 15 configured to transmit motion from a second motor M2 to the adjustment unit 14 in order to simultaneously adjust the radial position of the tools 13.

The transmission unit 15 comprises a differential device 16 kinematically connected between the second motor M2 and the adjustment unit 14, so that an adjustment of the position of the tools 13 with respect to the elongated product P, and therefore to the axis of rotation Z, corresponds to the drive of the second motor M2.

In particular, the differential device 16 can be directly coupled to the adjustment unit 14 and to the rotating head 11 by means of a single transmission unit 15.

The rotating head 11 comprises a mandrel 17 rotating about the axis of rotation Z by means of the drive of the first motor M1 and a fixed structure 18, see FIG. 2, in which the mandrel 17 is housed.

The first motor M1 is an electric motor comprising at least one rotor 19 fixed to the mandrel 17 and at least one stator 20 associated with the fixed structure 18 and positioned around the rotor 19.

The mandrel 17 and first motor M1 assembly therefore substantially constitutes an electro-mandrel, by means of which it is possible to transmit the rotary motion about the axis of rotation Z to the rotating head 11. The rotor 19 can for example consist of one or more permanent magnets keyed onto the mandrel 17.

The elongated product P, during working, is positioned with its elongated axis of development substantially parallel and coincident with the axis of rotation Z, and is fed in a direction of feed F parallel to the axis of rotation Z.

By way of example only, the peeling machine 10 can be provided with feed means 21 provided to feed the elongated product P along the axis of rotation Z.

The rotating head 11 comprises a support body 22 associated with the mandrel 17, preferably rotating together with the mandrel 17.

The transmission unit 15 comprises a hollow shaft 23 on which a toothed wheel 24 is installed, which can kinematically mesh with a gear 25 made on the support body 22.

Figure 3:
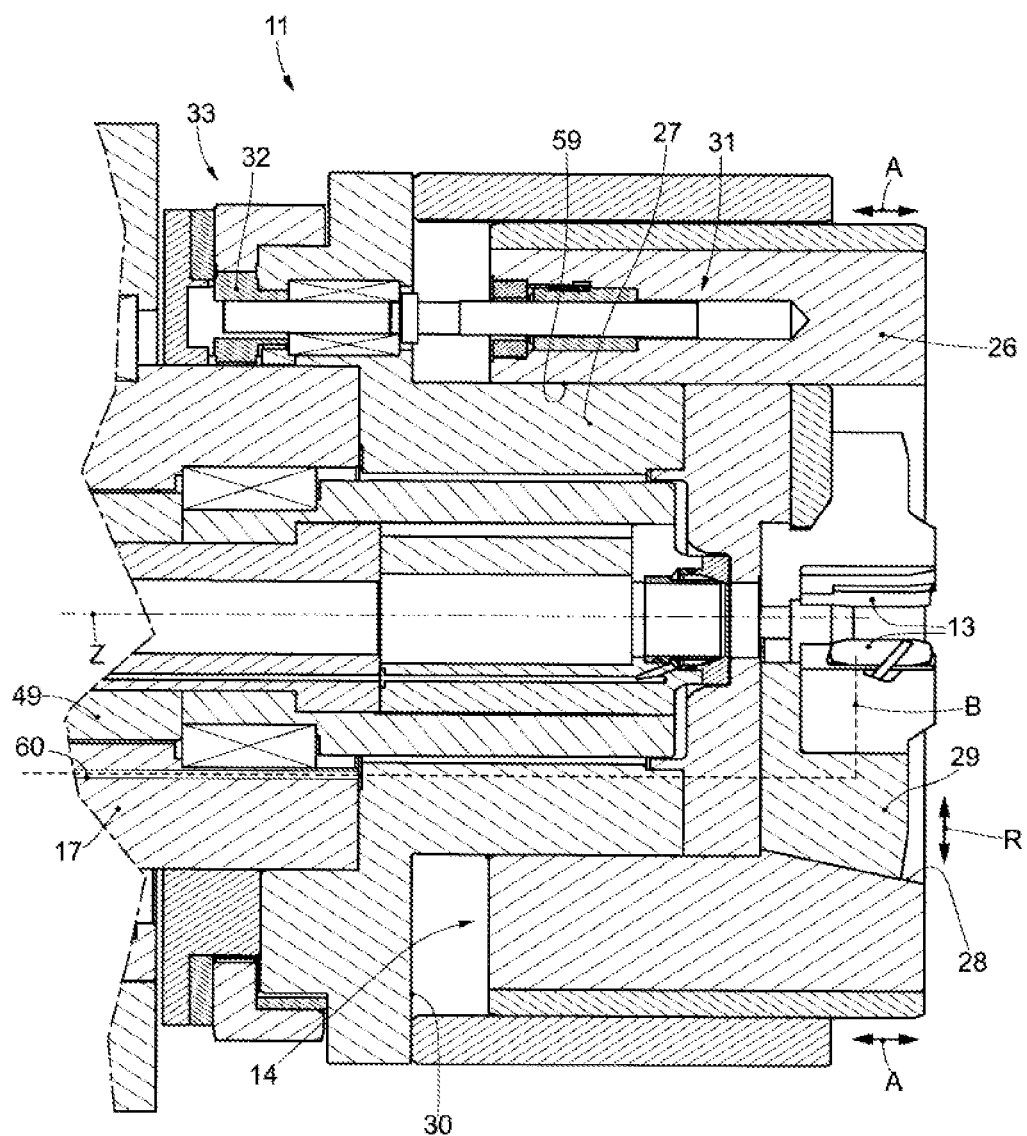
FIG. 3 is another longitudinal section view of the rotating head on a larger scale.

The adjustment unit 14, see also FIG. 3, comprises a fixed main body 27 on which a mobile conical ring 26 is positioned. The conical ring 26 can for example provide a through hole 59 by means of which it can be fitted around the main body 27.

In particular, the conical ring 26 is slidable in a bidirectional manner in a direction A parallel to the axis of rotation Z.

The conical ring 26 has, on the side where the rotating head 11 provides the tools 13, an inclined plane 28 on which sliders 29 for supporting the tools 13 rest.

The conical ring 26 is housed in a seating 30 associated with the adjustment unit 14 and, by way of a non-limiting example, in FIG. 2 the conical ring 26 abuts against the bottom of the seating 30, while in FIG. 3 it is translated exiting with respect to the seating 30 in direction A.

The sliding of the conical ring 26, for example exiting from the seating 30, causes a sliding of the sliders 29 in the radial direction R with respect to the axis of rotation Z. For example, in the situation shown in FIG. 3, the sliding of the sliders 29 along the inclined plane 28 causes the tools to move closer to the axis of rotation Z, therefore to the elongated product P of FIG. 1.

The adjustment unit 14 comprises at least one drive device 31 able to command the motion of the conical ring 26 in direction A. FIG. 1, for example, shows a plurality of drive devices 31 able to function simultaneously.

The drive device 31 can be, for example, a lead screw, in particular a roller screw or a ball screw.

The drive device 31 is associated with a toothed wheel 32 which meshes on a toothed crown 33 installed on the support body 22 in a manner selectively rotatable, also with respect to the support body 22, about an axis coincident with the axis of rotation Z. The toothed crown 33 is in turn provided with external toothing, and meshes with a toothed wheel 34 associated with the transmission unit 15 and therefore with the differential device 16.

The differential device 16 is kinematically connected between the second motor M2 and the adjustment unit 14 so that an adjustment of the tools 13 with respect to the axis of rotation Z corresponds to the drive of the second motor M2.

In particular, the combination between the configuration of the transmission unit 15 and the differential device 16 allows to adjust the position of the tools 13 even if the rotating head 11 is rotating about the axis of rotation Z.

The transmission unit 15 can comprise a kinematic transmission 35, kinematically connected to the drive devices 31.

The hollow shaft 23 of the transmission unit 15 can be provided with a transmission toothed wheel 36 rotatable integrally with the hollow shaft 23 about an axis of rotation X.

The transmission toothed wheel 36 is kinematically connected to the differential device 16 and acts as a solar toothed wheel for the satellite wheels of the differential device.

The differential device 16 comprises at least one first satellite toothed wheel 37, in this case three first satellite toothed wheels 37, which mesh on the transmission toothed wheel 36.

Each first satellite toothed wheel 37 is integrally installed on a satellite bearing shaft 38. On each satellite bearing shaft 38 there is also installed a second satellite wheel 39 rotatable integrally with the first satellite toothed wheel 37.

The differential device 16 also comprises a satellite bearing wheel 40 installed rotating about an axis coincident with the axis of rotation X and configured to support the satellite bearing shafts 38 rotatable in an idle manner, and so that the first satellite toothed wheels 37 mesh on the transmission toothed wheel 36. The axes of rotation of the satellite bearing shafts 38 are located parallel to the axis of rotation X of the hollow shaft 23.

The satellite bearing wheel 40 is kinematically connected to the second motor M2, which is configured to make the satellite bearing wheel 40 rotate about the axis of rotation X, causing the first satellite toothed wheels 37 to orbit around the transmission toothed wheel 36, that is, making the satellite bearing shafts 38 rotate about the axis of rotation X.

The second motor M2 is configured in such a way that, in its non-active configuration, it prevents the rotation of the satellite bearing wheel 40. In this condition, therefore, the satellite bearing shafts 38 are only rotatable about their own axes of rotation, but not about the axis of rotation X.

By way of example, the second motor M2 can be a stepper motor, a brushless motor, or a motor suitable to define a precise and accurate rotation of the satellite bearing wheel 40.

The satellite bearing wheel 40 is provided with an external toothing configured to mesh with a reduction unit 41 interposed between the second motor M2 and the satellite bearing wheel 40.

The reduction unit 41 can comprise a pinion 42 keyed onto a drive shaft 43 and a driven wheel 44 keyed instead onto a driven shaft 45.

The driven wheel 44 is connected to the satellite bearing wheel 40 of the differential device 16.

The drive of the second motor M2, therefore, makes the pinion 42 rotate, and consequently also the driven wheel 44 connected to it, which in turn transmits motion to the satellite bearing wheel 40.

The second satellite wheels 39 are kinematically connected to the kinematic transmission 35, thus defining the kinematic connection between the differential device 16 and the adjustment unit 14.

The kinematic transmission 35 comprises a first toothed wheel 46 which meshes on the at least one second satellite toothed wheel 39, in this case on three second satellite toothed wheels 39, thus defining the kinematic connection between the differential device 16 and the kinematic transmission 35. The first toothed wheel 46 is installed rotating about its own axis, which coincides with the axis of rotation X of the hollow shaft 23. The first toothed wheel 46 acts as a solar toothed wheel for the second satellite toothed wheels 39.

The first satellite toothed wheels 37 can have a nominal diameter equal to the nominal diameter of the first toothed wheel 46, while the second satellite toothed wheels 39 have the same nominal diameter as the transmission toothed wheel 36.

The first toothed wheel 46 is integrally installed on a transmission shaft 47, installed in the axial cavity of the hollow shaft 23 and coaxial therewith. This solution allows to drastically compact the overall bulk of the peeling machine 10, allowing to even work elongated products with a short length.

In particular, the transmission shaft 47 is positioned protruding cantilevered with the respective ends on one side and the other of the hollow shaft 23.

The first toothed wheel 46 is installed at one of the ends of the transmission shaft 47.

The transmission shaft 47 can be installed on supports, or bearings, attached in the cavity of the hollow shaft 23. However, we do not exclude that the supports of the transmission shaft 47 are installed outside the hollow shaft 23.

The transmission shaft 47 is connected to another toothed wheel, that is, the toothed wheel 34 kinematically connected to the adjustment unit 14 and installed integrally on the opposite end of the transmission shaft 47 to the one where the first toothed wheel 46 is installed.

The kinematic transmission 35 is configured in such a way that in the condition in which the second motor M2 is not active, the drive devices 31 are not made to rotate, while in the condition in which the second motor M2 is active, the drive devices 31 are made to rotate, thus determining an adjustment of the position of the tools 13, by sliding the conical ring 26 along the inclined plane 28.

The rotating head 11 is therefore provided with the toothed crown 33 installed on the support body 22 in a manner selectively rotatable, also with respect to the support body 22, about an axis coincident with the axis of rotation Z. The toothed crown 33 is kinematically connected to the drive devices 31 and to the kinematic transmission 35.

The toothed crown 33 is connected to the toothed wheel 34 of the transmission shaft 47, in order to receive motion from it.

The differential device 16 is therefore directly coupled to the rotation head 11 by means of the gear 25, the toothed wheel 24, and the hollow shaft 23 provided with the transmission toothed wheel 36 which meshes with the first satellite wheels 37, and to the adjustment unit 14 by means of the second satellite wheels 39, the transmission shaft 47 and the toothed wheels 34, 33, 32.

In the event the second motor M2 is fixed, that is, not active, the differential device 16 and the kinematic transmission 35 are configured so that the peripheral rotation speed of the toothed wheel 34 corresponds to the peripheral rotation speed of the rotating head 11 This embodiment prevents a relative rotary motion from establishing between the toothed crown 33 and the rotating head 11, which would determine a drive of the adjustment unit 14.

In the condition of second motor M2 active, the differential device 16 is configured to determine a rotation differential between the toothed crown 33 and the support body 22 of the rotating head 11.

The speed differential between the toothed crown 33 and the support body 22 determines an activation of the toothed wheels 32 and therefore a rotation of the drive devices 31.

Substantially, therefore, the differential device 16 is configured to make the toothed crown 33 rotate at the same speed as the rotating head 11 and keep the tools 13 in a fixed radial position when the second motor M2 is not driven, and to make the toothed crown 33 rotate with a differential speed with respect to the rotating head 11 and move the tools 13 radially when the second motor M2 is driven.

In the mandrel 17 there is housed at least one joint 51 for distributing a cooling fluid taken from a cooling system 50 and sent toward the tools 13 by means of a path B made in the rotating head 11. The cooling system 50 can be placed outside the peeling machine 10 or be part of it. The cooling system 50 can be a high pressure cooling system, that is, equipped with means for delivering and distributing a pressurized cooling fluid.

The distribution joint 51 is connected on one side to a fixed conduit of the cooling system 50 and on the other to a conduit 60 made through in the mandrel 17 rotating together with it, and is configured to transfer the fluid from one to the other. The fluid is then made to rotate and advance up to the tools 13 of the rotating head 11.

According to some embodiments, the joint 51 is positioned in the proximity of one end of the mandrel 17, opposite the end of the latter that is connected to the rotating head 11, and the conduit 60 extends substantially for the entire length of the mandrel 17. The conduit 60 can extend substantially parallel to the axis of rotation Z.

The mandrel 17 can comprise a hole 48 directed along the axis of rotation Z and in which there is housed at least one guide 49 integral with the fixed structure 18. This joint 51 is therefore housed between the guide 49 and the mandrel 17.

The joint 51 can comprise a fixed internal ring 52 associated with the guide 49 and a rotating external ring 53 associated with the mandrel 17.

The joint 51 can also comprise an annular hollow space 55 made between the internal ring 52 and the external ring 53. The internal ring 52 can comprise one or more holes 54 for the entry of the cooling fluid and the external ring 53 comprises one or more holes 56 for the exit of the cooling fluid. The cooling fluid, therefore, passes from the holes 54 of the internal ring 52 to the annular hollow space 55 and then exits from the holes 56 of the external ring 53.

The internal ring 52 could comprise an annular groove 57 where one or more holes 54 for the entry of the cooling fluid are made.

The external ring 53 could comprise an annular groove 58 where one or more holes 56 for the exit of the cooling fluid are made.

The cooling fluid can be, for example, emulsified water or any other cooling fluid whatsoever, suitable to be used in a peeling machine.

As a function of the cooling system 50 provided and associated with the peeling machine 10 and therefore with the rotating head 11, it is also possible to deliver the cooling fluid to the tools 13 even at high pressures, for example even up to about 70 bar.

It is clear that modifications and/or additions of parts may be made to the peeling machine 10 as described heretofore, without departing from the field and scope of the present invention as defined by the claims.

It is also clear that, although the present invention has been described with reference to some specific examples, a person of skill in the art shall certainly be able to achieve many other equivalent forms of peeling machine 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A peeling machine, comprising:
 a rotating head rotating about an axis of rotation and provided with a central cavity in which, during use, there is disposed an elongated product to be worked, said rotating head being provided with a plurality of tools and with at least one adjustment unit configured to move said tools away from or toward the elongated product;
 a first motor configured to make said rotating head rotate about said axis of rotation; and
 a transmission unit configured to transmit motion from a second motor to said adjustment unit in order to simultaneously adjust the radial position of said tools, said transmission unit comprising a differential device kinematically connected between said second motor and said adjustment unit so that an adjustment of the position of said tools with respect to said elongated product corresponds to the drive of said second motor,
 wherein said rotating head comprises a mandrel rotating about said axis of rotation by means of the drive of said first motor and a fixed structure in which said mandrel is housed,
 wherein said first motor is an electric motor comprising at least one rotor fixed to the mandrel and at least one stator mounted on said fixed structure and positioned around said rotor,
 wherein the machine further comprises a joint for distributing a cooling fluid housed in said mandrel and positioned in proximity of one end of the mandrel opposite an end of the mandrel connected to the rotating head and wherein a cooling system is able to send the cooling fluid to said joint and then, through a path made in the rotating head, to said tools,
 wherein said mandrel comprises a hole directed along said axis of rotation and in which there is housed at least one guide integral with said fixed structure.

2. The peeling machine as in claim 1, wherein said joint comprises a fixed internal ring fixed on said guide and a rotating external ring associated with said mandrel.

3. The peeling machine as in claim 2, wherein said joint comprises an annular hollow space made between said internal ring and said external ring, said internal ring comprising one or more holes for an entry of the cooling fluid and said external ring comprising one or more holes for an exit of the cooling fluid.

4. The peeling machine as in claim 3, wherein said internal ring comprises an annular groove where said one or more holes for the entry of the cooling fluid are made.

5. The peeling machine as in claim 3, wherein said external ring comprises an annular groove where said one or more holes for the exit of the cooling fluid are made.

6. The peeling machine as in claim 1, wherein said path develops through a conduit which extends an entire length of said mandrel.

7. The peeling machine as in claim 6, wherein said conduit extends parallel to the axis of rotation.

8. The peeling machine as in claim 1, wherein said tools are supported by sliders slidable on at least one inclined plane made in at least one conical ring mobile inside said adjustment unit by means of one or more drive devices, wherein the sliding of the conical ring determines a sliding of the sliders in a radial direction with respect to the axis of rotation and therefore a movement of the tools toward or away from the elongated product being worked.

9. The peeling machine as in claim 8, wherein said adjustment unit comprises a fixed main body on which said conical ring is positioned, said conical ring being slidable with respect to said main body in a bidirectional manner and in a direction parallel to said axis of rotation by means of said one or more drive devices.

10. The peeling machine as in claim 8, wherein said one or more drive devices comprise one or more lead screws.

11. The peeling machine as in claim 1, wherein said differential device is directly coupled to said adjustment unit and to said rotating head by means of said transmission unit.

12. The peeling machine as in claim 1, wherein said transmission unit comprises a hollow shaft, on which a toothed wheel is installed which kinematically meshes with a gear made on a support body of said rotating head, wherein said hollow shaft is provided with a transmission toothed wheel integrally rotatable therewith about an axis of rotation, and kinematically connected to said differential device.

13. The peeling machine as in claim 12, wherein said differential device comprises at least one first satellite wheel configured to mesh with said transmission toothed wheel and at least one second satellite wheel integrally rotatable with said at least one first satellite toothed wheel and configured to mesh with a first toothed wheel integrally installed on a transmission shaft disposed in said hollow shaft and connected to a toothed wheel kinematically connected to said adjustment unit.

14. The peeling machine of claim 10, wherein said one or more lead screws include one or more roller screws.

15. The peeling machine of claim 10, wherein said one or more lead screws include one or more ball screws.

* * * * *